US009166963B2

(12) United States Patent
Ramesh et al.

(10) Patent No.: US 9,166,963 B2
(45) **Date of Patent: *Oct. 20, 2015**

(54) DISTRIBUTED SECURITY ARCHITECTURE

(71) Applicant: The Boeing Company, Chicago, IL (US)

(72) Inventors: Tirumale K. Ramesh, Centreville, VA (US); John L. Meier, St. Charles, MO (US); Jason Edward Amanatullah, Campbell, CA (US); Ming-Yuh Huang, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,619

(22) Filed: Apr. 29, 2013

(65) Prior Publication Data

US 2013/0239171 A1 Sep. 12, 2013

Related U.S. Application Data

(63) Continuation of application No. 12/043,034, filed on Mar. 5, 2008, now Pat. No. 8,434,125.

(51) Int. Cl.
*H04L 29/06* (2006.01)
*H04L 29/08* (2006.01)

(52) U.S. Cl.
CPC ............ *H04L 63/08* (2013.01); *H04L 63/0218* (2013.01); *H04L 63/0263* (2013.01); *H04L 63/101* (2013.01); *H04L 69/32* (2013.01); *H04L 63/20* (2013.01)

(58) Field of Classification Search
CPC ........................................ H04L 63/08
USPC ........................................ 726/1
See application file for complete search history.

(56) References Cited

U.S. PATENT DOCUMENTS 6,744,729 B2 6/2004 Tinsley
6,981,029 B1 12/2005 Menditto et al.

(Continued)

OTHER PUBLICATIONS

M Ratola, "Which Layer for Mobility?—Comparing Mobile IPv6, HIP and SCTP", HUT T-110.551 Seminar on Internetworking, 2004, pp. 1-9.*

(Continued)

*Primary Examiner* — Bradley Holder
*Assistant Examiner* — Ali Shayanfar
(74) *Attorney, Agent, or Firm* — Patterson & Sheridan, LLP

(57) ABSTRACT

A distributed security architecture may include: a mobile anti-tamper hardware policy enforcement point configured to control communication behaviors of a mobile or stationary client by enforcing communication policies within a policy decision point; an anti-tamper hardware policy decision point encapsulated within the anti-tamper hardware policy enforcement point; a policy exchange channel for policy distribution modes configured to distribute and/or update communication and routing security policies to the client; a context manager configured to handle system-wide status change update signaling; and an authentication manager configured to provide clients with registration and credential/role assignments based on access policies. The distributed security architecture may be configured to provide open system interconnection layer 3.5 policy-based secure routing, and open system interconnection layer 2 policy-based mandatory access control address filtering to provide secure communication and computing for layers 4, 5, 6, and 7.

12 Claims, 8 Drawing Sheets

| OPEN SYSTEM INTECONNECTION (OSI) Layers | Description |
|---|---|
| 7 | Application |
| 6 | Presentation |
| 5 | Session |
| 4 | Transport |
| 3.5 | Claimed OSI-3.5 Distributed Security Policy Enforcement Layer |
| 3 | Network |
| 2 | Data Link |
| 1 | Physical |

(56) References Cited

U.S. PATENT DOCUMENTS

| | | | | |
|---|---|---|---|---|
| 7,272,625 | B1 * | 9/2007 | Hannel et al. | 709/200 |
| 7,299,339 | B2 | 11/2007 | Ramesh | |
| 7,539,175 | B2 * | 5/2009 | White et al. | 370/350 |
| 7,716,240 | B2 | 5/2010 | Lim | |
| 7,821,929 | B2 * | 10/2010 | DelRegno et al. | 370/230 |
| 7,831,693 | B2 | 11/2010 | Lai | |
| 2002/0194506 | A1 * | 12/2002 | Wiley et al. | 713/201 |
| 2005/0152270 | A1 | 7/2005 | Gomez Paredes et al. | |
| 2005/0182582 | A1 | 8/2005 | Chen | |
| 2006/0031450 | A1 | 2/2006 | Unrue et al. | |
| 2006/0089938 | A1 | 4/2006 | Leonard et al. | |
| 2006/0095716 | A1 | 5/2006 | Ramesh | |
| 2007/0162599 | A1 | 7/2007 | Nguyen | |
| 2008/0022354 | A1 * | 1/2008 | Grewal et al. | 726/1 |
| 2008/0040574 | A1 | 2/2008 | Ramesh | |
| 2008/0120264 | A1 | 5/2008 | Lee et al. | |
| 2008/0263625 | A1 * | 10/2008 | Gomez et al. | 726/1 |
| 2009/0006116 | A1 | 1/2009 | Baker et al. | |
| 2009/0034738 | A1 * | 2/2009 | Starrett | 380/278 |
| 2009/0086971 | A1 | 4/2009 | Grayson et al. | |
| 2009/0113514 | A1 * | 4/2009 | Hu | 726/1 |
| 2010/0111081 | A1 * | 5/2010 | Diab | 370/389 |

OTHER PUBLICATIONS

Kibria et al, On designing issues of the next generation mobile network, , IEEE, 2007,vol. 21 Issue:1, pp. 6-13.*

Drago et al, Security aspects in IPv6 networks—implementation and testing, vol. 33 Issue 5-6, Sep. 2007 pp. 425-437.*

Mika Ratola, Which Layer for Mobility?—Comparing Mobile IPv6, HIP and SCTP, 2004, Helsinki University of Technology.

* cited by examiner

| OPEN SYSTEM INTECONNECTION (OSI) Layers | Description |
|---|---|
| 7 | Application |
| 6 | Presentation |
| 5 | Session |
| 4 | Transport |
| 3.5 | Claimed OSI-3.5 Distributed Security Policy Enforcement Layer |
| 3 | Network |
| 2 | Data Link |
| 1 | Physical |

FIG. 1

| Layer | Critical Issues |
|---|---|
| Application Layer 7 | Detecting and preventing viruses, worms, malicious codes, and application/insider abuses, transaction anomaly detection, policy authorization framework, vulnerability assessment and risk management. |
| Transport Layer 4 | Authenticating and securing end-to-end communication through data encryption |
| Network Layer 3 | Protecting the ad-hoc routing and forwarding protocols from attacks, denial of service attacks |
| Link Layer 2 | Protecting wireless mandatory access control protocol and providing link- layer security support including prevention of mandatory access control address cloning attacks |
| Physical Layer 1 | Signal/radio jamming denial of service attacks |

FIG. 2

```
<POLICY>
    <ROLE name="POLICE">
        <THREAT name="ORANGE">
            <POLICY_RULE name="H323">
                <ALLOW name="POLICE">
                    <DIRECTION>INOUT</DIRECTION>
                </ALLOW>
            </POLICY_RULE>
        </THREAT>
        <THREAT name="RED">
            <POLICY_RULE name="H323">
                <ALLOW name="POLICE">
                    <DIRECTION>INOUT</DIRECTION>
                </ALLOW>
                <ALLOW name="FIRE">
                    <DIRECTION>INOUT</DIRECTION>
                </ALLOW>
            </POLICY_RULE>
        </THREAT>
    </ROLE>
</POLICY>
```

FIG. 6

DISTRIBUTED SECURITY ARCHITECTURE

RELATIONSHIP TO OTHER APPLICATION(S)

This non-provisional application is a continuation of U.S. patent application Ser. No. 12/043,034 filed Mar. 5, 2008, the disclosure of which is incorporated herein by reference in its entirety for all purposes permitted under law.

BACKGROUND

In the next-generation distributed computing environment, large scale systems of systems may have a large number of roaming mobile or stationary nodes/devices/clients. These devices may form various communities of interests to carry out the intended commercial, military, or social processes. The concept of community of interests (COI) formation may represent the very foundation of next generation information assurance challenges, such as complex authorization, i.e., who gets access to what. In the military context, an example may be intelligence sharing amongst multiple agencies based on various need-to-know security credentials as well as secure operation governing policies.

Such highly dynamic environments may also be characterized by several additional security challenges. The number of nodes may be high and the number of the communities of interests that could formulate may also be high. Security management of such highly complex environments may require new and innovative solutions. A percentage of these nodes may be mobile, such as in the mobile ad-hoc network environment. They may come and go frequently. Effective secure routing and communication may need to be addressed.

The business logic that dictates how these nodes work together (e.g., community of interests formation based on necessary conditions) may be highly complicated. Furthermore, the business logic that dictates the security behaviors of fixed-nodes (infrastructure nodes) may need to be consistently enforced onto the nodes to avoid double standards. The complexity of the future business model such as virtual enterprise, collaborative engineering, and coalition warfare may not be implemented by today's limited static mobile information assurance (IA) solutions.

The future may be a very dynamic environment. The dynamics may not only come from the nodes moving around and moving in and out of communities of interests. The dynamics may also come from constant and rapid changes of business requirements at the application level, e.g., virtual enterprise contract re-negotiation, coalition warfare procedure updates, etc. All of these changes may require rapid re-configuration of security parameters in both the mobile and static environments, and these roaming nodes/devices may need to comply rapidly to conform with new high level business requirement updates. Timing may also be essential to have the ability to update the policies as well as in the distribution and propagation of updates to the nodes.

One challenge being faced today is that traditional software-oriented mobile information assurance implementation may not only expose these mobile devices/clients to the before mentioned traditional attacks, but it may also not provide an effective community of interests management framework to allow these devices to work together securely and dynamically to satisfy both mandatory access control and discretionary access control requirements of next generation human business processes.

The future may require a more comprehensive hardware/software combined technology solution that addresses not only open system interconnection (OSI) layer 6-7 application software security, but that also may utilize advanced hardware implementation to aid network/routing layer isolation and community of interests formation. To align with such trends, a hardware/software combined solution is needed that addresses critical needs in next generation distributed system security applications.

SUMMARY

In one aspect of the disclosure, a distributed security architecture may comprise the following: an anti-tamper hardware policy enforcement point that may be configured to control communication behaviors of a client by enforcing communication policies within a policy decision point; an anti-tamper hardware policy decision point that may be encapsulated within the anti-tamper hardware policy enforcement point; a policy exchange channel for policy distribution nodes that may be configured at least to one of distribute and update communication and routing security policies to the client; a context manager (CM) that may be configured to handle system-wide status change update signaling; and a mobility authentication manager that may be configured to provide clients with registration and credential/role assignments based on access policies. The distributed security architecture may be configured to provide OSI layer 3.5 policy-based secure routing, and open system interconnection layer 2 policy-based mandatory access control address filtering in order to provide secure communication and computing for layers 4, 5, 6, and 7.

In another aspect of the disclosure, a method of implementing policies to clients may be provided. In one step of an illustrative embodiment of the invention that is useful in a mobile environment, a secure mobile routing policy may be provided. In another step, a packet discrimination policy may be provided. In still another step, the secure routing policy and the packet discrimination policy may be distributed to the clients.

In still another aspect of the disclosure, a method for creating a hardware and software combined solution may be provided. In one step, a hardware and software combined solution may be provided. In another step, open system interconnection layer processing may be provided. In still another step, the open system interconnection layer processing may be implemented into the hardware and software combined solution.

In yet another aspect of the disclosure, a method of defining a packet discrimination policy may be provided. In one step, specifications of packets may be provided that should be received by clients. In another step, the packets received by the clients may be used to create a protocol session at an open system interconnection layer 4.

In one embodiment of this aspect of the invention, there is provided the step of enforcing the specifications of packets at a policy decision point. In another embodiment, there is provided the step of controlling a communications characteristic of the client in response to the step of enforcing the specifications of packets. There is additionally provided the step of discarding packets received by a client in response to the step of controlling a communications characteristic of the client, as not conforming to the communications characteristic of the client.

In an advantageous embodiment of the invention, there is provided the step of authorizing a client to effect a system status change by controlling a system contextual flag. The client is one that may have previously been granted special permission to effect the system status change. There is then provided the step of varying the step of enforcing the specifications of packets at a policy decision point in response to the system status change. In one embodiment, a community of interests is formed of clients that have related interests as conforming to the specification of packets. However, in accordance with an embodiment of the invention, there is provided the step of configuring a community of interests, or reconfiguring the community of interests, in response to the system status change. Moreover, plural communities of interests can be reconfigured in response to the system status change, and some of the communities of interests can be configured to overlap in response to the system status change. In some embodiments, there is provided the step of controlling a context manager to effect a system-wide status change in response to the system status change and/or the specifications of packets at a policy decision point.

In accordance with a further method aspect of the invention, there is provided a method of enhancing communications security between a plurality of clients via a multi-layer open system interconnection network having a physical layer (1), a data link layer (2), a network layer (3), and a transport layer (4). The method includes the step of interposing a policy enforcement layer (3.5) between the network layer (3) and the transport layer (4), the policy enforcement layer (3.5). In addition, the method includes the further steps of receiving at a policy decision point a policy from a policy distribution node; distributing the policy to selected ones of the clients; and enforcing the policy at a policy enforcement point.

It is to be understood that the plurality of clients can include a plurality of mobile clients, but is not so limited. In some embodiments, the plurality of clients includes a plurality of stationary clients that may, in some embodiments, be nodes of a larger communication system or other infrastructure where the nodes therein need to communicate securely with one another. In addition, the clients are not limited to handheld mobile devices, but may include mobile transport vehicles with stationary monitoring stations.

In accordance with an embodiment of the invention, there is provided the step of providing a contextual flag that is indicative of a system status, and the step of enforcing the policy is responsive to the contextual flag. In some embodiments, the step of distributing the policy to selected ones of the clients is responsive to the contextual flag. In addition, as noted above, there is provided in some embodiments the step of granting permission to a selected client to alter the contextual flag and the corresponding system status.

In another embodiment, prior to performing the step of receiving at a policy decision point a policy there is provided the step of formulating an authentication policy at a mobility authentication manager. In one embodiment, the authentication policy identifies respective entitlements of the clients. In addition, prior to performing the step of distributing the policy there is provided the further step of receiving at a policy decision point a policy from a policy distribution node. In some embodiments, the policy distribution node is a physical infrastructure. Policy information is exchanged between the policy distribution node and the client in some embodiments via a policy exchange channel. In some embodiments, there is the step of treating a policy distribution node as a target client by the policy exchange channel. The step of distributing the policy to selected ones of the clients includes, in some embodiments, the step of distributing the policy to policy decision points of the clients.

In accordance with a further aspect of the invention, there is provided a communications system for securing communications amongst a plurality of clients. The communications system includes a policy distribution node for storing a communications policy. A plurality of policy decision points are provided, each associated with a respective one of the plurality of clients. A policy exchange system for communicates the communications policy from the policy distribution node to the policy decision points. Additionally, a mobility authentication manager determines access control identities and roles for respective ones of the clients.

In one embodiment of this system aspect of the invention, the plurality of clients includes a mobile client. In other embodiments, the mobile client includes a mobile communications device. In still further embodiments, the plurality of clients includes a system node.

In a further embodiment, there is provided a plurality of policy enforcement points, each associated with a respective one of the plurality of clients, for controlling the communication behavior of a client. A contextual flag communication arrangement is provided for communicating a system status to a client. In addition, there is provided in some embodiments a context manager arrangement, and the contextual flag communication arrangement communicates a change in system status from a selected client to the context manager arrangement.

BRIEF DESCRIPTION OF THE DRAWING

FIG. 1 shows one embodiment of a standard-based Open Systems Interconnection (OSI) reference model with abstractions of layers 1 through 7, and layer 3.5 that is situated in between OSI layer 3 and OSI layer 4;

FIG. 2 is a chart showing one embodiment of how a combination of authenticity, confidentiality, integrity, anonymity, and availability may be implemented in the model of FIG. 1;

FIG. 6 shows illustrative policy specification language under one embodiment of the disclosure;

DETAILED DESCRIPTION

Figure 3:
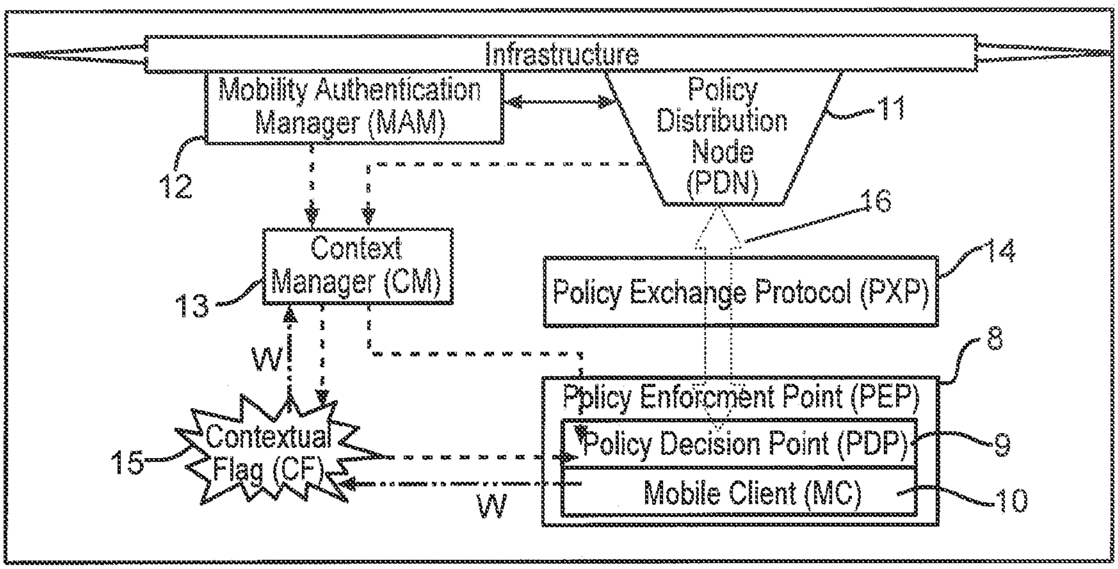
FIG. 3 is a diagram showing one embodiment of a distributed security architecture.

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Beyond the goal of the original internet that may have been to provide reliable and resilient end-to-end communication between pairs of hosts, the disclosure may provide policy-managed communities of interests within which individuals and/or system nodes may access network-connected data, computing, tooling and other assets they may need to engage.

As such, therefore, the invention is not limited to mobile communications systems, but may be employed in stationary communications systems that illustratively have plural communications nodes, as well as systems that have combined mobile and stationary clients or nodes. The clients In the architecture provided by the disclosure, assets may be kept under the control of a policy manager. In other words, assets may be protected so that they respond only to requests from subjects based on the approval of entitlement-specifying policies. The policy-enabled community of interests (COIs) of the disclosure may have the ability to provide superior frameworks for regulating the way complex processes work. The community of interests policies of the disclosure may be used to define regulations regarding how private information is controlled. The information assurance provided by the disclosure may go beyond just securing information. As discussed below, the assurance solutions of the disclosure may provide authenticity, confidentiality, integrity, anonymity, and availability.

The disclosure may provide authenticity by requiring a digital authentic originality of each element. The authenticated elements may include subject, person, software, hardware, system processes, information/data, and others. Additionally, non-repudiation (e.g., authentic accountability during a digital communication or transaction) may also be part of the authenticity requirement.

The disclosure may provide confidentiality by protecting the elements from preying eyes. The elements that may be protected may include, but not be limited to, data, information, aggregated information, processes, identity, communication, and transaction meta-information such as volume. Solutions such as public key infrastructure may be used to achieve both authenticity and confidentiality purposes using public and private key pairs.

The disclosure may provide integrity by making sure the element content has not been altered. One example may be avionic hardware/software of airplanes. Compromised data content may potentially lead to fatal consequences. The elements that may require integrity protection may include, but not be limited to, software, hardware, communication channels, and processes.

The disclosure may provide anonymity by helping to protect against cyber crime and other potential abuses to retain the privacy for both individuals and businesses. As part of the overall information assurance requirements, anonymity may protect the identity of potential victims from the investigating parties. The disclosure may require software, hardware, communication, and process anonymity.

The disclosure may provide availability by providing available infrastructures to protect against threats including denial of service or distributed denial of service. These types of threats may create huge volume traffic/transactions that may overwhelm victims and may prevent them from performing regular services. The denial of service caused by these types of threats may not be limited to only open system interconnection layer 3 packet flooding attacks. For instance, the denial of service may happen at transport layer 1 with radio jamming as well as at layer 6 with transaction volumes. The system of the present disclosure may reduce these threats.

FIG. 1 shows one embodiment of an open systems interconnection basic reference model (Open System Interconnection reference model—OSI model for short) with abstractions of layers 1 through 7, and layer 3.5 that is situated in between OSI layer 3 and OSI layer 4. The open systems interconnection reference model may comprise a layered, abstract description for communications and computer network protocol design, developed as part of an open systems interconnection initiative. It may also be called an open system interconnection seven layer model. The layers may comprise, from top to bottom, an application layer 7, a presentation layer 6, a session layer 5, a transport layer 4, an OSI layer 3.5 distributed security policy enforcement layer, a network layer 3, a data link layer 2, and a physical layer 1. A layer may comprise a collection of related functions that may provide services to the layer above it, and that may receive service from the layer below it. For example, a layer that provides error-free communications across a network may provide the path needed by applications above it, while it may call the next lower layer to send and receive packets that make up the contents of the path. The disclosure may provide areas of authenticity, confidentiality, integrity, anonymity, and availability, at various levels in the open system interconnection layer.

The context of security primitives contributions in the layers are described below. In traditional firewall implementations, protection profiles tend to be static and their implementation is often geared toward protecting static infrastructure enclaves. In the upcoming next generation of computing paradigms, in which collaboration, sharing, and efficiency may be crucial, traditional firewall implementations may not be able to scale up to meet the challenge. Furthermore, continual changes in security requirements, as may result, for example, from business contract negotiations, updates, suspicions, dynamic coalition warfare agreements, and new and improved business paradigms, may require flexible and expressive policy-based implementation orientations to satisfy environments where there may be increases in network connectivity, mobility, and community of interests (COI) complexity.

While not all layers (such as the presentation layer 6) may be fully implemented in today's communication systems, each layer may present its own risk in the information assurance context. For example, at physical layer 1, physical media (wire or wireless) may be vulnerable to various physical attacks. Similarly, in a mobile ad-hoc network (MANET) environment, at layer-3, there may exist various attack on the mobile routing protocol.

FIG. 2 shows a chart showing, under one embodiment of the disclosure, how a combination of authenticity, confidentiality, integrity, anonymity, and availability may be implemented in application layer 7, transport layer 4, network layer 3, link layer 2, and physical layer 1 of FIG. 1 in order to provide a comprehensive information assurance solution in the open system interconnection layers. In other embodiments, the comprehensive information assurance solution may also be applied in presentation layer 6, session layer 5, and/or distributed security policy enforcement layer 3.5 of FIG. 1 to provide authenticity, confidentiality, integrity, anonymity, and availability in all layers.

As discussed below, the technology herein disclosed may provide an open system interconnection layer 3.5 with policy-based secure routing, and an open system interconnection layer 2 with policy-based mandatory access control address filtering in order to provide secure communication/computing foundations for layers 4, 5, 6, and 7. This may integrate with other advanced information assurance technologies at layer 2 and below, as well as at layer 5 and above, to achieve more comprehensive LSI (large-scale system of systems integration) competitive technology capability.

FIG. 3 is a simplified function block representation if a specific illustrative embodiment of the invention that is useful to describe a distributed security architecture directed to a mobile client embodiment of the invention that may address mobile information assurance (IA) challenges by presenting an OSI middle layer 3.5 and below with hardware/software combined solutions in conjunction with available anti-tamper technology. This illustrative embodiment may be further characterized by the concept of distributing security policies directly into secure mobile devices, stationary devices, system nodes, and clients. By doing so, these clients may become security aware due to the presence of the policies, and may work together uniformly to formulate one or more appropriate communities of interests (COIs) to satisfy high level business process security requirements. The specific illustrative embodiment of the invention may not address physical anti-tamper technology.

The functions of the architectural components shown in FIG. 3 are described below, in the context of the specific illustrative mobile client embodiment of the invention. A policy enforcement point (PEP) 8 may control the communication behaviors of mobile client 10 to support a method for encapsulation by enforcing the communication policies within a policy decision point (PDP) 9. Policy decision point 9 may control the policy distribution/update between policy decision point 9 and an infrastructure policy distribution node (PDN) 11 to support a method in which, based on the permissions specified in policies carried by policy decision point 9, the policy decision point may control read access to contextual flags (CF) 15 for context-aware (e.g., elevated alert) decision making by at policy decision point 9. This may support a method in which, based on the permissions specified in policy decision point 9, policy enforcement point 8 controls the write access to contextual flags 15 for global situation updates (e.g., to elevate alert(s) proactively) that may subsequently affect the decision making at policy decision point 9 in other mobile clients (MCs) 10.

Policy decision point 9 may support its encapsulation within policy enforcement point 8, and may allow its implementation with anti-tamper field programmable gate array (FPGA) hardware (not specifically designated) to ensure the integrity of the authorization logic. Policy decision point 9 may also provide hardware implementations that are read-proof to prevent authorization logic disclosures. Furthermore, policy decision point 9 may provide policies that may come from the infrastructure policy distribution node 11, which may be a target-client within a policy authorization framework.

Mobile client 10 may support encapsulation within policy enforcement point 8 and policy decision point 9, and may support a method in which, depending on the permissions specified by mobile client 10 via policy decision point 9 policies, some mobile clients 10 may be granted privileges to update certain contextual flags 15 to cause global behavior changes. For example, if per the specification in the policies, an hypothetical colonel may be allowed the privilege of updating the "Alert Level" from yellow to red at his/her discretion, then, under such circumstances, mobile client 10 that is operated by the colonel may be allowed to access the "write" port of the "Alert Level" contextual flags 15 per the communication policy specification within policy decision point 9. Such an update may create cascading effects on other mobile clients 10, which may be an intended security behavior articulated by the policies.

A policy distribution node (PDN) 11 may be provided that may distribute and update communication and routing security policies to mobile clients 10 via a policy exchange channel (PXC) 16 with policy distribution nodes 11 acting as target-clients and distributing security policies to policy decision points 9 of mobile clients 10. Not all mobile clients 10 may carry security policies. Therefore, policy distribution node 11 may be policy based for selective and secure policy distribution. Working with a mobility authentication manager (MAM) 12, policy distribution node 11 may distribute the appropriate set of security policies to mobile clients 10 based on their mandatory access control identities and roles (entitlements). This may be where the policy mapping occurs from OSI layer 7 application to layer 3.5 communication. When application layer 7 policy is mapped to layer 3.5, certain networking information may be required, such as the subject's and object's (e.g., colonel, command-and-control node) IP address, port number, or mandatory access control address. Within this context, layer 3.5 policy may be defined to enforce ultimate security requirements by executing the necessary enforcement paradigm. Working policy distribution node 11 and mobility authentication manager 12 may provide the appropriate networking parameter and context for the appropriate policy articulation and distribution.

Policy exchange protocol 14 may provide for a secure security assertion protocol that may allow distribution of policies from policy distribution node 11 to policy decision point 9 through policy enforcement point 8. Existing industry standards such as SAML (security assertion markup language), RMI (remote method invocation), TLS (transport layer security), or SSH FTP secure extension (RFC2228) may be reviewed for policy exchange protocol 14 implementation.

A context manager (CM) 13 may be provided that handles system-wide status change update signaling including, e.g., alert level updates, policy updates, client revocations, etc. Context manager 13 may update "policy update" contextual flags 9 based on the notices from policy distribution node 11. Such updates may alert mobile client 10, policy enforcement point 8, and policy decision point 9 to perform proactive policy decision point 9 policy updates. Such updates of contextual flag 15 may not comprise the policy distribution action itself. Instead, it may comprise an update of a contextual flag 15 beacon that may indicate the need for mobile client 10 to return to policy distribution node 11 for policy update and distribution. This may be illustrated in FIGS. 4 and 5, where "Policy Update" notification may be broadcast using the similar mechanism as alert level 23 flag, as discussed later herein. Since the agents may be out in the field with unknown connectivity, this mechanism may provide a notification paradigm where agents monitor contextual flag 15 and return (pull back) for policy updates rather than policy distribution node 11 attempting to "push" policies to agents with unknown connectivity. Context manager 13 may also maintain appropriate "revocation update" contextual flags 15 based on notices from mobility authentication manager 12. Such updates may alert mobile client 10, policy enforcement point 8, and policy decision point 9 of the availability of updates on revocation on identities and roles (credentials). Mobile client 10, policy enforcement point 8, and policy decision point 9 may then proceed to connect and receive updates from policy distribution node 11. As a result of such revocations, policy decision point 9 policy decision result may be different. In other words, context manager 13 may control the "beacons" that are necessary in managing the update and life-cycle of mobile clients 10.

Contextual flags 15 may be used for global data storage media for system-wide status indication. Contextual flag 15 may perform global status publish and subscription functions working in conjunction with policy decision point 9. When making decisions, policy decision point 9 policies may take into consideration certain global variables, such as "alert level", "system ready status", or "resource availability" contextual flags 15 to become context aware in the real time evaluation and decision making process. Depending on the permission specified by the policies within policy decision point 9, some mobile clients 10 may have the authority to update contextual flags 15. Thus, these mobile clients 10 may have the ability to indirectly affect subsequent global policy decision point 9 decision making via contextual flag 15 updates. Typically, these mobile clients 10 may have the roles of sensor or situation assessment nodes.

Mobility authentication manager 12 may provide mobile clients 10 with initial registration and credential/role assignments that may provide mobile clients 10 with identity and entitlement to update the revocation process. It may also provide mobile clients 10 with identity and role information to policy distribution node 11 for appropriate policy distribution and updates. Mobility authentication manager 12 may alert context manager 13 when updates or revocations require the attention of mobile client 10. Different kinds of security policies such as secure mobile routing polices that define selective routing behavior, packet discrimination policies that define selective packet reception behavior, and OSI layer-2 mandatory access control address filtering policies that defines selective frame level connectivity behavior may all be distributed to policy decision points 9 associated with mobile clients 10.

The architecture components described in FIG. 3 may be implementations at open system interconnection layer 3.5. The security policies enforced by these architecture components may be extensions from OSI layer 7 application level policies, roles, meta data tags, and the necessary MAC address and IP address mapping. As such, OSI layer 3.5 may work with OSI layer 7 to achieve systematic engineering process-based communication security enforcement to enhance the overall MANET mobile network security.

Secure mobile routing policies may control mobile clients 10 to perform mobile routing service. The policies may specify which neighbors mobile client 10 should trust for routing, as well as to what degree mobile clients 10 should participate in generic routing. The policies may be written in such a way that the logic will take into consideration the various contextual flags 15 status updates, and will instruct mobile clients 10 to behave differently in routing participation. In another embodiment incorporating varying policies, the routing behavior may be more or less restrictive (more or less secure) as well as more or less dynamic (e.g., responding to emergency situations). Layer 3.5 policies may not exist by themselves. They may comprise an integral part of the overall comprehensive open system interconnection layer 1-7 security architecture.

In accordance with the invention herein described, human/business system security requirements (often in human language—e.g., English, business, contracts, laws, operation procedures) may be modeled and captured into roles, meta-data tags, and application level authorization policies in the policy authorization framework context. This may be how the application level security policies may be extrapolated into layer 3.5 policies that may be carried with it the appropriate context of roles, meta data tags, context, etc.

For example, a battleground operation procedure may mandate colonels have access to command-and-control data. This may be captured in a layer-7 application requirement model, and in a subsequent application security policy saying: colonel 4 command and control data. Such a policy may be further enhanced by extrapolation using a mandatory access control address, an IP address of the colonel's handheld device, a mandatory access control/internet protocol addresses of the command and control data resource clients, and any additional context data such as the time of day (e.g., 8:00-18:00). Thus at layer 3.5, a hardware enforced policy may look like: colonel radio's internet protocol and port→command and control 2 data client's internet protocol and port, if current time is between 8:00 and 18:00. In the meantime, all other communication may be effectively blocked out (packets dropped) to prevent the spread of worms, viruses, and trojans, unless there are other policy-approved communication channels for the hosts.

Packet discrimination policies that may reside in policy decision point 9 (shown in FIG. 3) may comprise unique features that specify which of the packets received by the client may be used to construct protocol/session and above (open system interconnection layer 4 and above). Essentially, un-trusted packets may be discarded per the specification of the policies. As a result, OSI layers 4, 5, 6, and 7 may each have no visibility on these potentially harmful packets and therefore may each be immune from the potential damage. The application and the system may then be protected from the harms that could come from these communications. By distributing and enforcing layer 3.5 security policies to nodes, stationary clients, mobile clients, nodes of communications systems, etc., various communities of interests may be formed. Additionally, proprietary and other authorization control architecture principles may be applied to the specified policies based on the method in the control architecture that may result in a scalable community of interests infrastructure.

Figure 4:
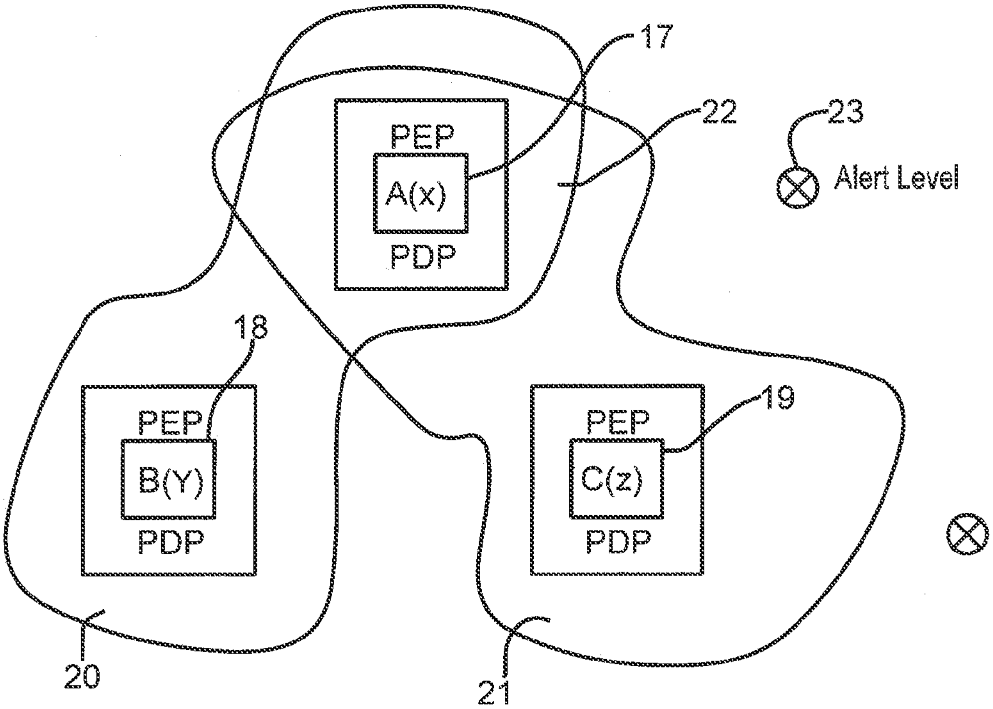
FIG. 4 is an overlapping chart of a specific illustrative embodiment of the invention showing conceptually how mobile clients may form two different communities of interests based on their roles, mobile policy enforcement point, and mobile policy decision point.

FIG. 4 is an overlapping chart of one embodiment showing conceptually how mobile clients 17, 18, and 19 (A, B, and C) may form two different communities of interests based on their roles and may encapsulate the policy enforcement point and the policy decision point (i.e., encapsulating the policy decision point and policy enforcement point of A, B, and C). It is to be understood that the present embodiment, which is cast in the context of mobile clients, is illustrative and not limiting, and other clients, such as stationary clients and nodes of stationary and mobile systems (not shown) can benefit from the practice of the present invention. Client A 17 may comprise Role-X, which may be the FBI, Client B 18 may comprise Role-Y, which may be the EMT, and Client C 19 may comprise Role-Z, which may be the Police. These policies may dictate that Role-Y (EMT) is entitled to community of interests COI 20, Role-Z (Police) is entitled to community of interests (COI) 21, and Role-X (FBI) is entitled to community of interests (COI) 22 comprising both community of interests (COI) 20 and community of interests (COI) 21. There may also be context-flags 23 that denote situations such as alert-level 23 to indicate global emergency status or policy updates to indicate availability of new policy sets. These context-flags 23 may be monitored by 17 (A), 18 (B), and 19 (C), and may be used for policy evaluation decision making by policy decision point 9.

All three mobile clients 17, 18, and 19 may, in this specific illustrative embodiment of the invention, be encapsulated in an anti-tamper hardware implemented policy enforcement point 8 environment to ensure faithful execution of the policies of policy decision point 9 (i.e., encapsulating policy enforcement point/policy decision point surrounding A, B, and C). Policy decision point 9 itself may also comprise anti-tamper hardware normally implemented with a field programmable gate array (FPGA).

Open system interconnection 3.5 policies may be intelligent to take into consideration the contextual situation such as alert elevation and the reform community of interests configuration.

Figure 5:
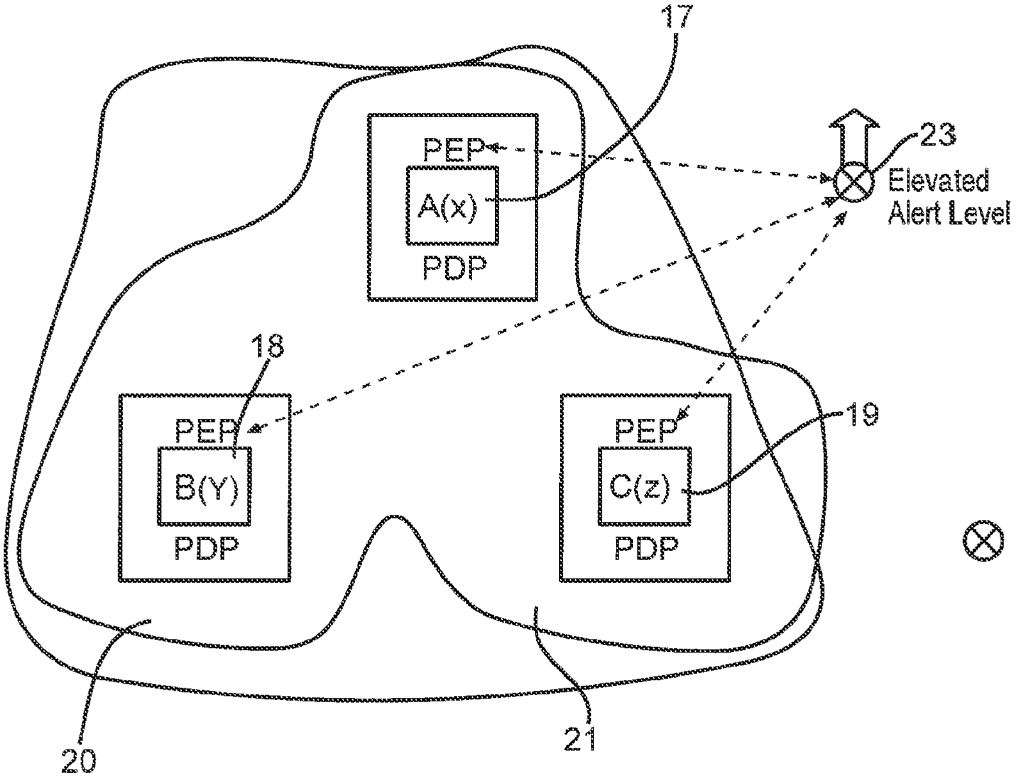
FIG. 5 shows a community of interests (COI) reconfiguration of FIG. 4 when alert levels maybe elevated and information sharing level may be increased in response to the alert elevation situation.

FIG. 5 shows a community of interests reconfiguration when alert levels 23 may be elevated and information sharing level may be increased in response to the alert elevation situation. Assuming that the policies may further dictate roles, a Role-Y (EMT) of client B 18 may be entitled to community of interests (COI) 20 when alert 23 is low and may also be entitled to community of interests (COI) 21 when alert 23 is elevated. A Role-Z (Police) of client C 19 may be entitled to community of interests (COI) 21 when alert 23 is low, and may also be entitled to community of interests (COI) 20 when alert 23 is elevated. A Role-X (FBI) of client A 17 may be entitled to both community of interests (COI) 20 and community of interests (COI) 21 no matter whether alert 23 is low or elevated. Thus, when alert level 23 is elevated, a community of interests (COI) configuration may be significantly augmented. Here, due to the elevated alert 23, both the EMT (Role-Y) and the FBI (Role-Z) may be sharing both, community of interests (COI) 20 and community of interests (COI) 21, just like the police (Role-X). This scenario may illustrate how, in this new paradigm, when the distributed policies are evaluated in real time by policy decision point 9 (of FIG. 3) embedded with mobile clients 10 (of FIG. 3), contextual status may be taken into consideration and the information sharing structure via constructs such as community of interests (COI) may be dynamically adjusted to satisfy the need of environmental changes (e.g., elevated alert) based on the policy definition. This may represent significant progress in secure ad-hoc communication environments for information sharing and overall distributed system configuration management.

To be effective as an information assurance (IA) solution, one embodiment of the disclosure may be OSI as a complimentary functional add-on to the larger policy-based information assurance framework. The embodiment may take the policy/role enforcement orientation further down the OSI stack to layer 3.5. This combination may present a revolutionary and innovative solution to next generation infrastructure and computing. Under these policies, layer 7 applications and system may be protected from traditional software oriented attacks.

FIG. 6 shows illustrative policy specification language under one embodiment of the disclosure. The term 'policy' here simply references a service, such as H.323 VOIP (Voice Over IP) as shown in the figure. Such VOIP layer-5 policy specifications may be automatically extrapolated into layer-3.5 execution. Since a service may use multiple layer 3.5 sessions, layer 3.5 based policy management may require multiple handshakes to enforce the policy. H323 may comprise a perfect example of a transaction based policy since only one handshake may take place for two transmission control protocol (TCP) sessions and one user datagram protocol (UDP) flow.

Figure 7:
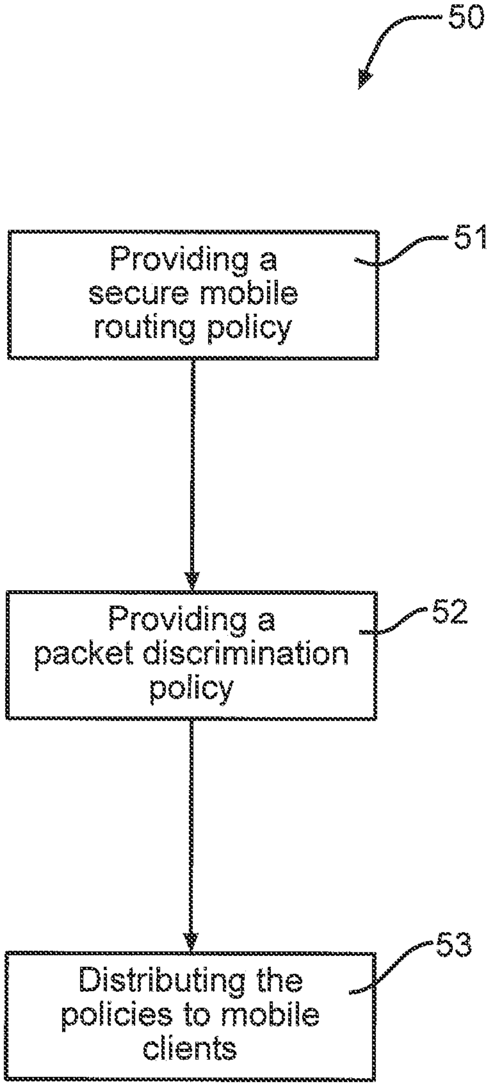
FIG. 7 is a simplified flowchart showing an specific illustrative embodiment of the invention of a method of implementing policies to mobile clients.

FIG. 7 is a simplified flowchart showing an embodiment of the invention of a method 50, illustratively of implementing policies to mobile clients. In a step 51, a secure mobile routing policy may be provided. In a step 52, a packet discrimination policy may be provided. In still another step 53, the secure mobile routing policy and the packet discrimination policy may be distributed to the mobile clients.

Figure 8:
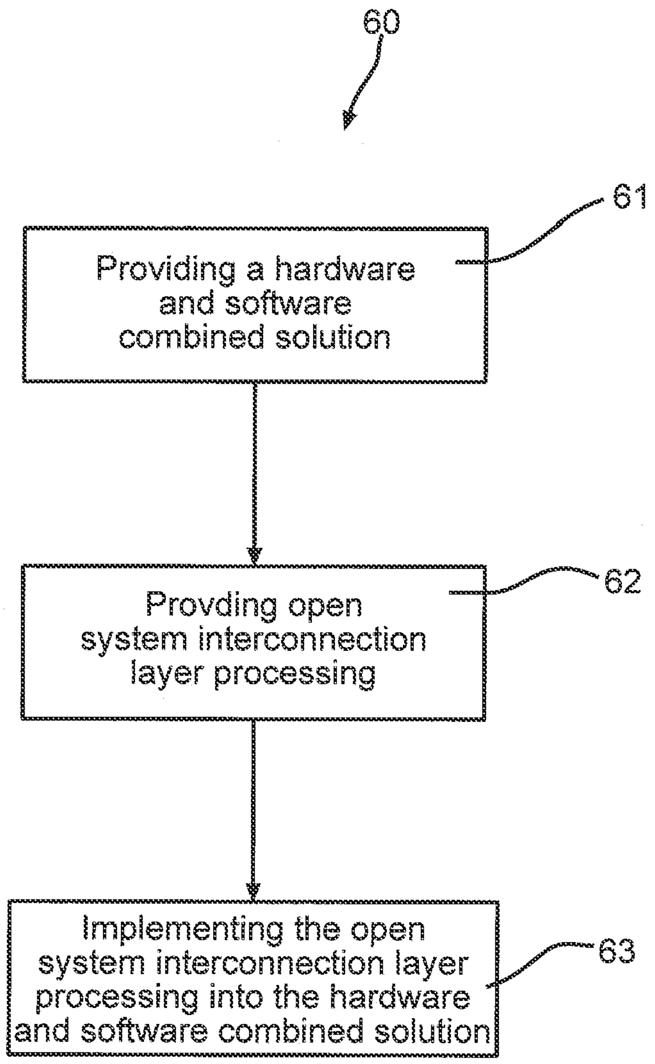
FIG. 8 is a flowchart showing another embodiment of a method for creating a hardware and software combined solution.

FIG. 8 is a simplified flowchart showing an illustrative embodiment of a method 60 for creating a hardware and software combined solution. In a step 61, a hardware and software combined solution may be provided. In step 62, open system interconnection layer processing may be provided. In step 63, the open system interconnection layer processing may be implemented into the hardware and software combined solution.

Figure 9:
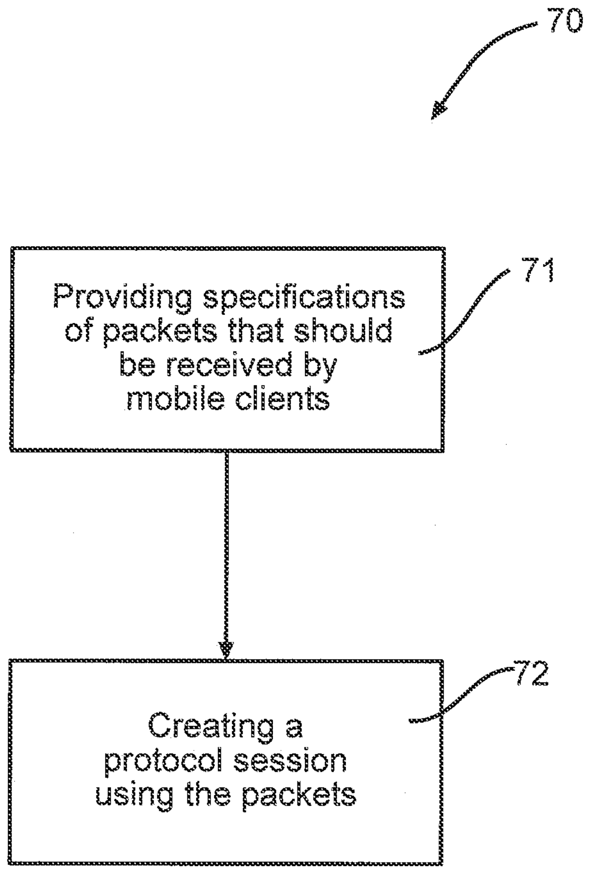
FIG. 9 is a flowchart showing still another embodiment of a method defining a packet discrimination policy.

FIG. 9 is a simplified flowchart showing an embodiment of a method 70 that is directed, for sake of illustration, to the defining of a packet discrimination policy in a mobile environment. In step 71, specifications of packets received by mobile clients may be provided. In step 72, the packets received by the mobile clients may be used to create a protocol session at least one of at and above an open system interconnection layer 4.

The technical effects and technical problems in the present disclosure are exemplary and are not limiting. It should be noted that the embodiments described in the present specification may have other technical effects and can solve other technical problems. Although some of the exemplary embodiments are presented in the context of a mobile environment, it is to be understood that the invention is not limited in its application to mobile systems and clients, and is additionally applicable to static and stationary multi-node (i.e., multi-client) embodiments, as herein mentioned.

Other aspects and features of the present disclosure may be obtained from a study of the drawings, the disclosure, and the appended claims. It should be understood, of course, that the foregoing relates to exemplary embodiments of the disclosure and that modifications may be made without departing from the spirit and scope of the disclosure as set forth in the following claims.

What is claimed is:

1. A method for comprehensive processing of open system interconnection (OSI) layers for network/routing isolation and formation of a scalable community of interest providing a hardware and software combined solution that includes open system interconnection 3.5 processing comprising:

providing a hardware and software combined solution;

providing comprehensive open system interconnection layer 3.5 processing;

implementing the comprehensive open system interconnection layer 3.5 processing into the hardware and software combined solution for comprehensive processing of OSI layers for network/routing isolation and formation of a scalable community of interest; wherein the comprehensive open system interconnection layer 3.5 is in between network layer, layer 3, and transport layer, layer 4;

forming a first scalable community of interest based on at least a first security policy, wherein the first scalable community of interest admits at least a first set of mobile clients and wherein the first security policy includes a set of contextual flags, including at least an alert level flag and a system status flag;

accepting determinable portions of information data at the first set of mobile clients in response to a status condition of the system status flag;

receiving, from a first one of the mobile clients, a request to set the alert level flag to an elevated alert level; and upon verification that the first mobile client is authorized to write to the alert level flag, setting the alert level flag to an elevated alert level and admitting at least a second set of mobile clients to the first scalable community of interest.

2. The method of claim 1 wherein the providing the comprehensive open system interconnection layer 3.5 processing comprises providing secure comprehensive open system interconnection layer 3.5 processing.

3. The method of claim 2, wherein the implementing the comprehensive open system interconnection layer 3.5 processing into the hardware and software combined solution for the comprehensive processing of the OSI layers for the network/routing isolation and the formation of the scalable community of interest comprises issuing policy data of the first security policy within the comprehensive open system interconnection layer 3.5 processing to the first set of mobile clients.

4. The method of claim 3, wherein the issuing the policy data within the comprehensive open system interconnection layer 3.5 processing to the first set of mobile clients comprises:

issuing the information data to the first set of mobile clients; and accepting the determinable portions of the information data at the first set of mobile clients, the determinable portions of the information data being responsive to the policy data.

5. A non-transitory computer-readable storage medium storing one or more applications, which, when executed on a processor, perform an operation for comprehensive processing of open system interconnection (OSI) layers for network/routing isolation and formation of a scalable community of interest providing a hardware and software combined solution that includes open system interconnection 3.5 processing, the operation comprising:

providing a hardware and software combined solution;

providing comprehensive open system interconnection layer 3.5 processing;

implementing the comprehensive open system interconnection layer 3.5 processing into the hardware and software combined solution for comprehensive processing of OSI layers for network/routing isolation and formation of a scalable community of interest; wherein the comprehensive open system interconnection layer 3.5 is in between network layer, layer 3, and transport layer, layer 4;

forming a first scalable community of interest based on at least a first security policy, wherein the first scalable community of interest admits at least a first set of mobile clients and wherein the first security policy includes a set of contextual flags, including at least an alert level flag and a system status flag;

accepting determinable portions of information data at the first set of mobile clients in response to a status condition of the system status flag;

receiving, from a first one of the mobile clients, a request to set the alert level flag to an elevated alert level; and upon verification that the first mobile client is authorized to write to the alert level flag, setting the alert level flag to an elevated alert level and admitting at least a second set of mobile clients to the first scalable community of interest.

6. The non-transitory computer-readable storage medium of claim 5, wherein providing the comprehensive open system interconnection layer 3.5 processing comprises providing secure comprehensive open system interconnection layer 3.5 processing.

7. The non-transitory computer-readable storage medium of claim 6, wherein the implementing the comprehensive open system interconnection layer 3.5 processing into the hardware and software combined solution for the comprehensive processing of the OSI layers for the network/routing isolation and the formation of the scalable community of interest comprises issuing policy data of the first security policy within the comprehensive open system interconnection layer 3.5 processing to the first set of mobile clients.

8. The non-transitory computer-readable storage medium of claim 7, wherein the issuing the policy data within the comprehensive open system interconnection layer 3.5 processing to the first set of mobile clients comprises:

issuing the information data to the first set of mobile clients; and accepting the determinable portions of the information data at the first set of mobile clients, the determinable portions of the information data being responsive to the policy data.

9. A system, comprising:

a hardware processor; and a memory storing one or more applications, which, when executed on the processor perform an operation for comprehensive processing of open system interconnection (OSI) layers for network/routing isolation and formation of a scalable community of interest providing a hardware and software combined solution that includes open system interconnection 3.5 processing, the operation comprising:

providing a hardware and software combined solution, providing comprehensive open system interconnection layer 3.5 processing, implementing the comprehensive open system interconnection layer 3.5 processing into the hardware and software combined solution for comprehensive processing of OSI layers for network/routing isolation and formation of a scalable community of interest, wherein the comprehensive open system interconnection layer 3.5 is in between network layer, layer 3, and transport layer, layer 4;

forming a first scalable community of interest based on at least a first security policy, wherein the first scalable community of interest admits at least a first set of mobile clients and wherein the first security policy includes a set of contextual flags, including at least an alert level flag and a system status flag, accepting determinable portions of information data at the first set of mobile clients in response to a status condition of the system status flag, receiving, from a first one of the mobile clients, a request to set the alert level flag to an elevated alert level, and upon verification that the first mobile client is authorized to write to the alert level flag, setting the alert level flag to an elevated alert level and admitting at least a second set of mobile clients to the first scalable community of interest.

10. The system of claim 9, wherein providing the comprehensive open system interconnection layer 3.5 processing comprises providing secure comprehensive open system interconnection layer 3.5 processing.

11. The system of claim 10, wherein the implementing the comprehensive open system interconnection layer 3.5 processing into the hardware and software combined solution for the comprehensive processing of the OSI layers for the network/routing isolation and the formation of the scalable community of interest comprises issuing policy data of the first security policy within the comprehensive open system interconnection layer 3.5 processing to the first set of mobile clients.

12. The system of claim 11, wherein the issuing the policy data within the comprehensive open system interconnection layer 3.5 processing to the first set of mobile clients comprises:

issuing information data to the first set of mobile clients; and accepting the determinable portions of the information data at the first set of mobile clients, the determinable portions of the information data being responsive to the policy data.

* * * * *